United States Patent
Chen et al.

(10) Patent No.: US 10,427,407 B2
(45) Date of Patent: Oct. 1, 2019

(54) PRINTER CIRCUIT BOARD FLUID EJECTION APPARATUS

(71) Applicant: HEWLETT-PACKARD DEVELOPMENT COMPANY, L.P., Houston, TX (US)

(72) Inventors: Chien-Hua Chen, Corvallis, OR (US); Michael W Cumbie, Albany, OR (US); Devin Alexander Mourey, Albany, OR (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 342 days.

(21) Appl. No.: 15/122,701

(22) PCT Filed: Mar. 31, 2014

(86) PCT No.: PCT/US2014/032420
§ 371 (c)(1),
(2) Date: Nov. 2, 2016

(87) PCT Pub. No.: WO2015/152889
PCT Pub. Date: Oct. 8, 2015

(65) Prior Publication Data
US 2017/0120596 A1    May 4, 2017

(51) Int. Cl.
*B29C 69/00* (2006.01)
*B41J 2/16* (2006.01)
(Continued)

(52) U.S. Cl.
CPC ........... *B41J 2/1637* (2013.01); *B23K 26/402* (2013.01); *B24C 1/04* (2013.01); *B29C 69/001* (2013.01);
(Continued)

(58) Field of Classification Search
CPC ........ B41J 2/1637; B41J 2/162; B41J 2/1752; B41J 2/1603; B41J 2/1639; B41J 2/1632;
(Continued)

(56) References Cited

U.S. PATENT DOCUMENTS

| 5,894,108 A * | 4/1999 | Mostafazadeh ....... H01L 21/568 174/529 |
| 6,627,467 B2 | 9/2003 | Haluzak et al. |
| 9,962,936 B2 * | 5/2018 | Lutnesky ................. B41J 2/155 |
| 2003/0007034 A1 | 1/2003 | Horvath et al. |
| 2003/0048330 A1 | 3/2003 | Scheffelin et al. |

(Continued)

FOREIGN PATENT DOCUMENTS

| CN | 1254648 A * | 5/2000 |
| WO | WO-2013180715 | 12/2013 |

OTHER PUBLICATIONS

Cheng, et al A Monolithic Thermal Ink-jet Print Head Combining Anisotropic Etching and Electro Plating, In Input/Output and Imaging Technologies II, Proceedings of SPIE vol. 4080, Jul. 26-27, 2000.

*Primary Examiner* — Matthew J Daniels
*Assistant Examiner* — Asha A Thomas
(74) *Attorney, Agent, or Firm* — HP Inc. Patent Department

(57) ABSTRACT

In an example, a method for making a fluid ejection apparatus may include forming a molding material over a fluid passage on a back surface of printhead die, embedding the printhead die in an encapsulant in a cavity in a printed circuit board such that at least one drop ejector of the printhead die is exposed at a front side of the printed circuit board, removing the encapsulant at a back side of the printed circuit board to expose the molding material, and removing the molding material to form a fluid feed slot through which fluid may flow to the fluid passage opening in the printhead die.

20 Claims, 9 Drawing Sheets

(51) Int. Cl.
*B41J 2/175* (2006.01)
*B23K 26/402* (2014.01)
*B24C 1/04* (2006.01)
*B29L 31/00* (2006.01)

(52) U.S. Cl.
CPC ............. *B41J 2/162* (2013.01); *B41J 2/1603* (2013.01); *B41J 2/1632* (2013.01); *B41J 2/1639* (2013.01); *B41J 2/1752* (2013.01); *B29L 2031/767* (2013.01)

(58) Field of Classification Search
CPC ....... B29C 69/001; B23K 26/402; B24C 1/04; B29L 2031/767
See application file for complete search history.

(56) References Cited

U.S. PATENT DOCUMENTS

| | | |
|---|---|---|
| 2004/0113996 A1 | 6/2004 | Boyd et al. |
| 2008/0122899 A1 | 5/2008 | Lee et al. |
| 2010/0156989 A1 | 6/2010 | Petruchik |
| 2011/0037808 A1* | 2/2011 | Ciminelli ............. B41J 2/14072 347/50 |
| 2013/0106017 A1* | 5/2013 | Asai ........................ B41J 2/1603 264/219 |
| 2013/0169710 A1 | 7/2013 | Keefe et al. |
| 2013/0215197 A1* | 8/2013 | Hays ........................ B41J 2/161 347/40 |
| 2013/0272809 A1* | 10/2013 | Childers, Jr. ............. B23C 5/10 408/124 |
| 2018/0154636 A1* | 6/2018 | Chen ........................ B41J 2/155 |

* cited by examiner

PRINTER CIRCUIT BOARD FLUID EJECTION APPARATUS

BACKGROUND

Printhead dies in an inkjet pen or print bar may include channels that carry fluid, such as ink, to the ejection chambers. Ink may be distributed from the ink supply to the die channels through passages in a structure that supports the printhead die(s) on the pen or print bar. It may be desirable to shrink the size of each printhead die, for example to reduce the cost of the die and, accordingly, to reduce the cost of the pen or print bar. The use of smaller dies, however, may require changes to the larger structures that support the dies, including the passages that distribute ink to the dies.

BRIEF DESCRIPTION OF THE DRAWINGS

The detailed description section references the drawings, wherein.

Figure 1:
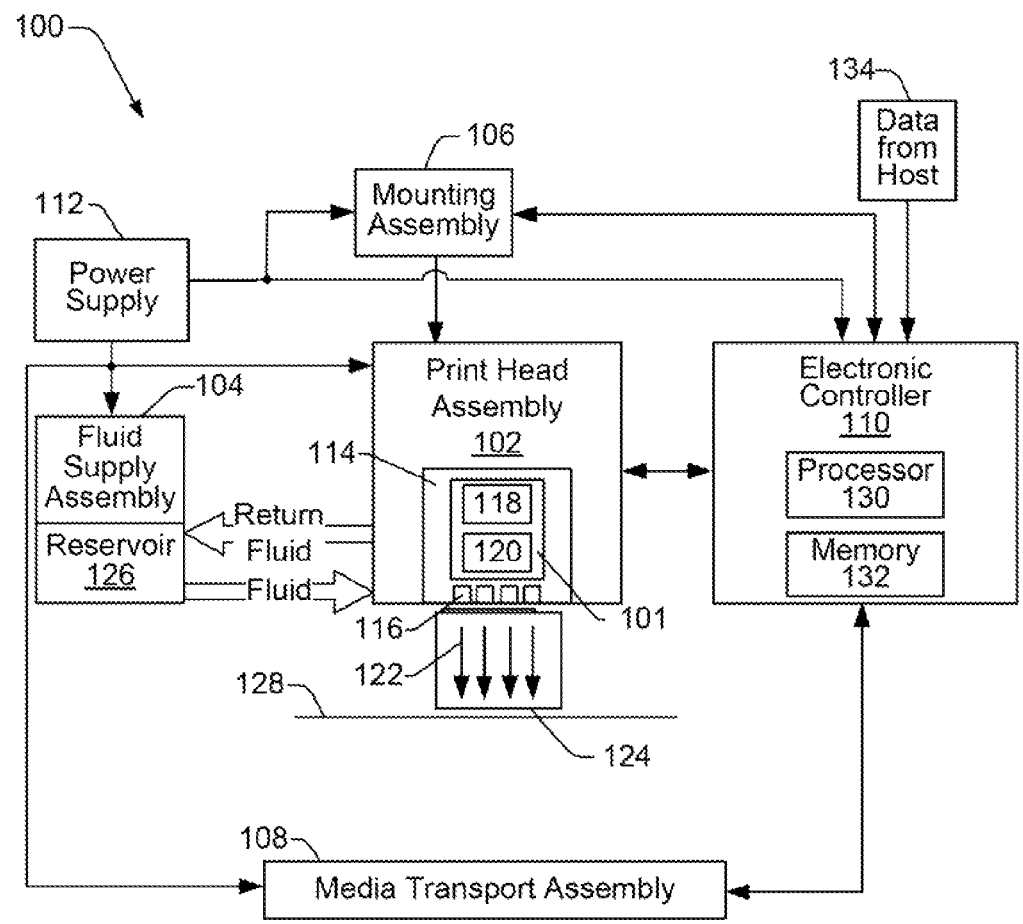
FIG. 1 is a block diagram of an example fluid ejection system.

all in which various embodiments may be implemented. Examples are shown in the drawings and described in detail below. The drawings are not necessarily to scale, and various features and views of the drawings may be shown exaggerated in scale or in schematic for clarity and/or conciseness. The same part numbers may designate the same or similar parts throughout the drawings.

DETAILED DESCRIPTION

Inkjet printers that utilize a substrate wide print bar assembly have been developed to help increase printing speeds and reduce printing costs. Conventional substrate wide print bar assemblies include multiple parts that carry printing fluid from the printing fluid supplies to the small printhead dies from which the printing fluid is ejected on to the paper or other print substrate. While reducing the size and spacing of the printhead dies continues to be important for reducing cost, channeling printing fluid from the larger supply components to ever smaller, more tightly spaced dies requires complex flow structures and fabrication processes that can actually increase cost.

Described herein are various implementations of fluid ejection apparatuses and systems, and methods for making such apparatuses and systems, comprising a molded fluid ejection panel, which may enable the use of smaller printhead dies and more compact die circuitry to help reduce cost in substrate wide inkjet printers. In various implementations, a method for making a molded fluid ejection panel may include forming a molding material over a fluid passage on a back surface of printhead die, embedding the printhead die in an encapsulant in a cavity in a printed circuit board such that at least one drop ejector of the printhead die is exposed at a front side of the printed circuit board, removing the encapsulant at a back side of the printed circuit board to expose the molding material, and removing the molding material to form a fluid feed slot through which fluid may flow to the fluid passage opening in the printhead die. In various implementations, removing the encapsulant may comprise plunge-cutting into the encapsulant without cutting into the printed circuit board. In other implementations, removing the encapsulant may comprise back grinding, laser ablating, or powder blasting the encapsulant without cutting into the printed circuit board.

For the implementations described herein, using the molding material to form, at least in part, the fluid feed slot, may allow for a reduction in depth of the cut into the encapsulant, which may help avoid cutting into the printed circuit board or having to customize the printed circuit board in a manner to avoid being cut during the operation to remove the encapsulant to expose the molding material and form the fluid feed slot.

In various implementations, a molded fluid ejection panel comprising an embedded printed circuit board and printhead dies in effect grows the size of each printhead die for making fluid and electrical connections and for attaching the printhead dies to other structures, thus enabling the use of smaller dies. For the various implementations described herein, a molded fluid ejection panel may enable the use of long, narrow and very thin printhead dies. For example, a 100 μm thick printhead die that is about 26 mm long and 500 μm wide can be embedded in a 1 mm thick printed circuit board to replace a conventional 500 μm thick silicon printhead die. The ease with which printed circuit boards can be fabricated and processed may also help simplify the fabrication of page wide print bars and other printhead structures as new, composite structures with built-in printing fluid channels, eliminating the difficulties of forming the printing fluid channels in a substrate.

In various implementations, the molded fluid ejection panel may not be limited to print bars or other types of printhead structures for inkjet printing, but may be implemented in other devices and for other fluid flow applications. Thus, in one example, the molded fluid ejection panel may include a micro device embedded in a printed circuit board having fluid feed slots and channels therein through which fluid may flow to the micro device. The micro device, for example, could be an electronic device, a mechanical device, or a microelectromechanical system (MEMS) device. The fluid flow, for example, could be a cooling fluid flow into or onto the micro device or fluid flow into a printhead die or other fluid dispensing micro device.

As used herein, a "printed circuit board" (sometimes abbreviated "PCB") means a non-conductive substrate with conductive pathways for mechanically supporting and electrically connecting to an electronic device and may comprise a stack of a plurality of layers such as, for example, prepreg layers and conductor layers comprising metal; a "micro device" means a device, such as a printhead die, etc., having one or more exterior dimensions less than or equal to 30 mm; "thin" means a thickness less than or equal to 650 μm; a "sliver" means a thin micro device having a ratio of length to width (L/W) of at least three; a "printhead" and a "printhead die" mean that part of an inkjet printer or other inkjet type dispenser that dispenses fluid from one or more openings. A printhead includes one or more printhead dies. "Printhead" and "printhead die" are not limited to printing with ink and other printing fluids but also include inkjet type dispensing of other fluids and/or for uses other than printing.

Turning now to FIG. 1, illustrated is a block diagram of an example fluid ejection system 100 suitable for incorporating a molded fluid ejection panel 101 including an embedded printed circuit board and printhead die fabricated using a molding material to form, at least in part, a fluid feed slot through which fluid may flow to the fluid passage opening in the printhead die. In various implementations, the fluid ejection system 100 may comprise a thermal inkjet printer or printing system. The fluid ejection system 100 may include a printhead assembly 102, a fluid supply assembly 104, a mounting assembly 106, a media transport assembly 108, an electronic controller 110, and at least one power supply 112 to provide power to the various electrical components of fluid ejection system 100.

The printhead assembly 102 may include at least one printhead 114. The printhead 114 may include one or more printhead dies to supply a fluid, such as ink, for example, to a plurality of nozzles 116. The printhead 114 may comprise the molded fluid ejection panel 101 including a printed circuit board 118 and at least one printhead die 120 embedded in an encapsulant in accordance with the implementations described herein.

The plurality of nozzles 116 may eject ejects drops 122 of the fluid toward a print media 124 so as to print onto the print media 124. The print media 124 may be any type of suitable sheet or roll material, such as, for example, paper, card stock, transparencies, polyester, plywood, foam board, fabric, canvas, and the like. The nozzles 116 may be arranged in one or more columns or arrays such that properly sequenced ejection of fluid from nozzles 116 may cause characters, symbols, and/or other graphics or images to be printed on the print media 124 as the printhead assembly 102 and print media 124 are moved relative to each other.

The fluid supply assembly 104 may supply fluid to the printhead assembly 102 and may include a reservoir 126 for storing the fluid. In general, fluid may flow from the reservoir 126 to the printhead assembly 102, and the fluid supply assembly 104 and the printhead assembly 102 may form a one-way fluid delivery system or a recirculating fluid delivery system. In a one-way fluid delivery system, substantially all of the fluid supplied to the printhead assembly 102 may be consumed during printing. In a recirculating fluid delivery system, however, only a portion of the fluid supplied to the printhead assembly 102 may be consumed during printing. Fluid not consumed during printing may be returned to the fluid supply assembly 104. The reservoir 126 of the fluid supply assembly 104 may be removed, replaced, and/or refilled.

The mounting assembly 106 may position the printhead assembly 102 relative to the media transport assembly 108, and the media transport assembly 108 may position the print media 124 relative to the printhead assembly 102. In this configuration, a print zone 128 may be defined adjacent to the nozzles 116 in an area between the printhead assembly 102 and print media 124. In some implementations, the printhead assembly 102 is a scanning type printhead assembly. As such, the mounting assembly 106 may include a carriage for moving the printhead assembly 102 relative to the media transport assembly 108 to scan the print media 124. In other implementations, the printhead assembly 102 is a non-scanning type printhead assembly. As such, the mounting assembly 106 may fix the printhead assembly 102 at a prescribed position relative to the media transport assembly 108. Thus, the media transport assembly 108 may position the print media 124 relative to the printhead assembly 102.

The electronic controller 110 may include a processor 130, memory 132, firmware, software, and other electronics for communicating with and controlling the printhead assembly 102, mounting assembly 106, and media transport assembly 108. Memory 132 may include both volatile (e.g., RAM) and nonvolatile (e.g., ROM, hard disk, floppy disk, CD-ROM, etc.) memory components comprising computer/processor-readable media that provide for the storage of computer/processor-executable coded instructions, data structures, program modules, and other data for the printing system 100. The electronic controller 110 may receive data 134 from a host system, such as a computer, and temporarily store the data 134 in memory 132. Typically, the data 134 may be sent to the printing system 100 along an electronic, infrared, optical, or other information transfer path. The data 134 may represent, for example, a document and/or file to be printed. As such, the data 134 may form a print job for the printing system 100 and may include one or more print job commands and/or command parameters.

In various implementations, the electronic controller 110 may control the printhead assembly 102 for ejection of fluid drops 122 from the nozzles 116. Thus, the electronic controller 110 may define a pattern of ejected fluid drops 122 that form characters, symbols, and/or other graphics or images on the print media 124. The pattern of ejected fluid drops 122 may be determined by the print job commands and/or command parameters from the data 134.

In various implementations, the printing system 100 is a drop-on-demand thermal inkjet printing system with a thermal inkjet (TIJ) printhead 114. In some implementations, the printhead assembly 102 may include a single TIJ printhead 114. In other implementations, the printhead assembly 102 may include a wide array of TIJ printheads 114. In various implementations, the printhead assembly 102, fluid supply assembly 104, and reservoir 128 may be housed together in a replaceable device such as an integrated printhead cartridge.

Figure 2:
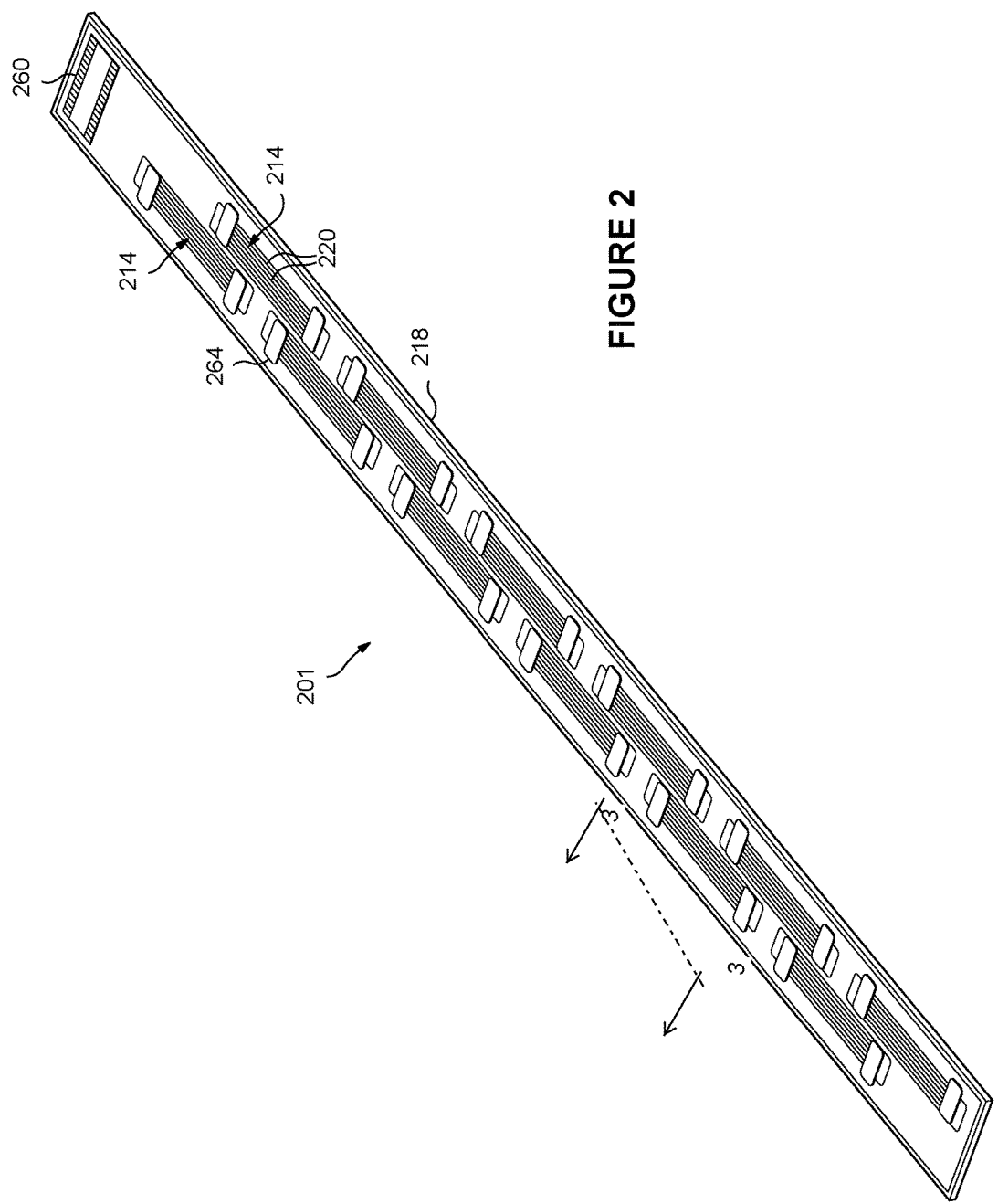
FIGS. 2-5 illustrate an example fluid ejection apparatus implemented as a fluid ejection panel.
Figure 3:
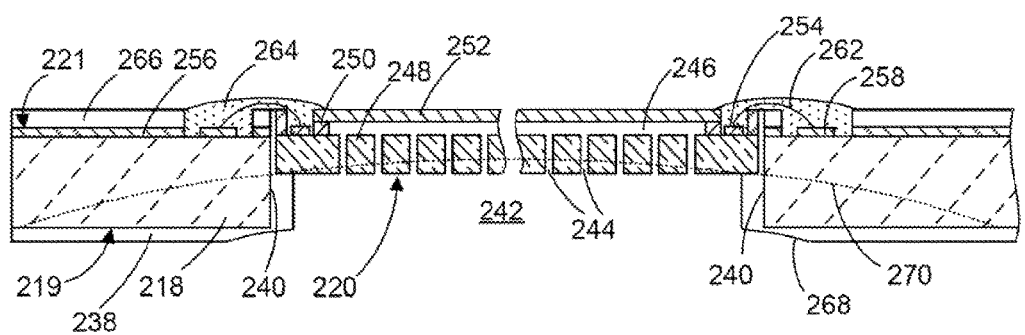
Figure 4:
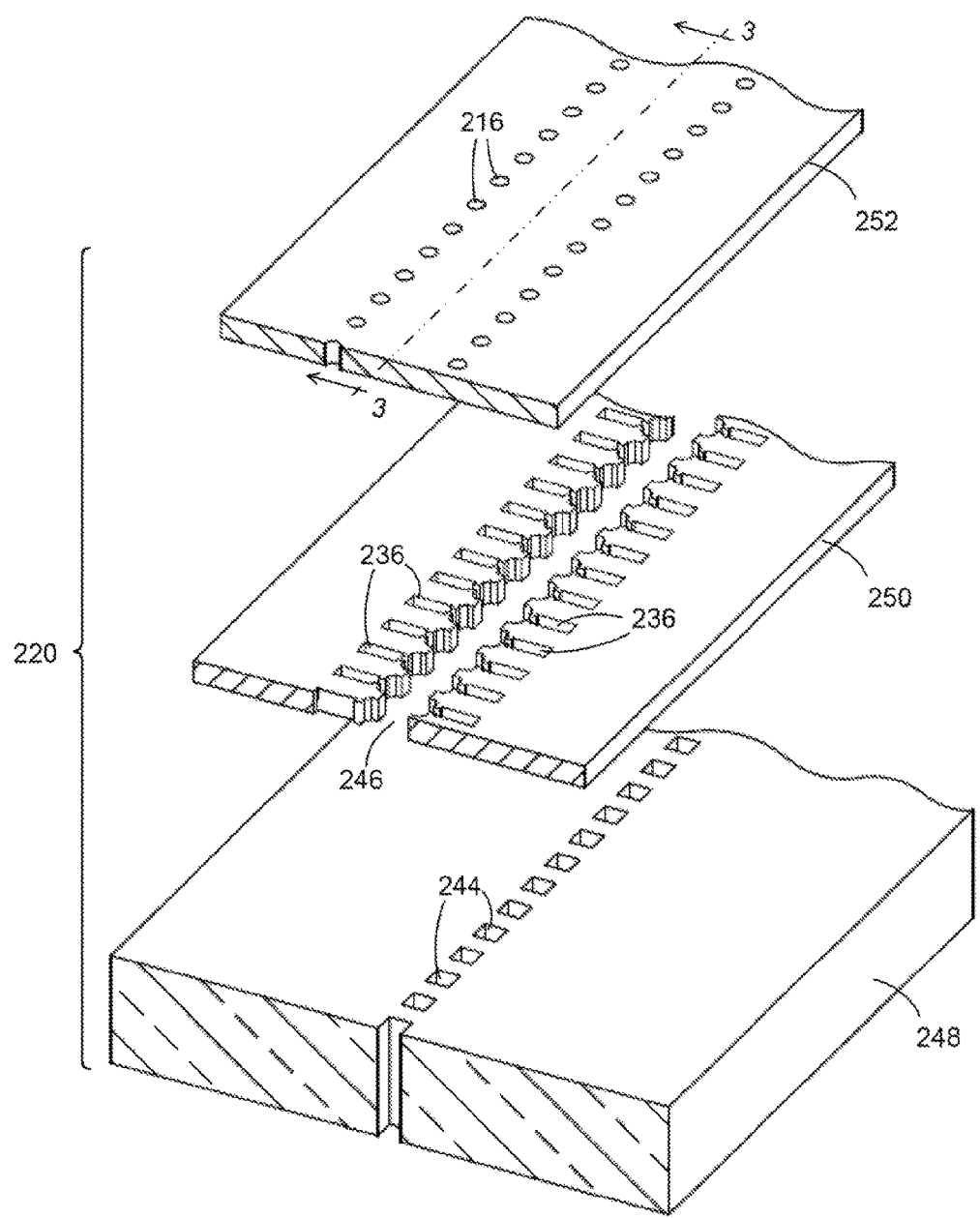
Figure 5:
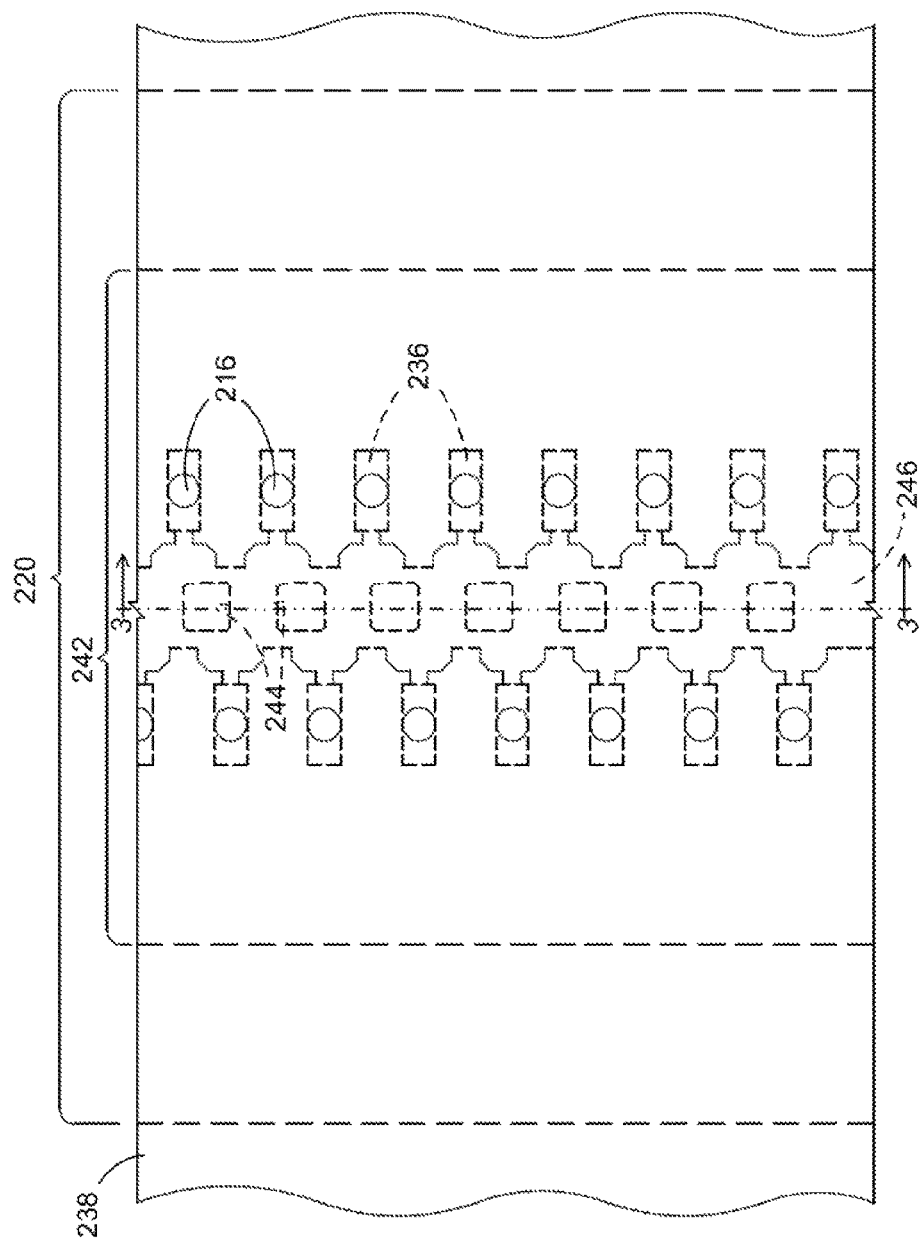

FIG. 2 illustrates an example molded fluid ejection panel 201 in which printhead dies 220 are embedded in a printed circuit board 218. FIG. 3 is a detailed view of the panel 201 shown in FIG. 2 along line 3-3. FIG. 4 and FIG. 5 are detailed views of one of the dies 220 shown in FIG. 2. In the illustrated example, the fluid ejection panel 201 may be configured as an elongated print bar such as might be used in a single pass substrate wide printer.

The fluid ejection panel 201 may include a plurality of printheads 214 embedded in an elongated printed circuit board 218 and arranged generally end to end in a row lengthwise in a staggered configuration in which the printheads 214 in the row overlap another printhead 214 in that row. Each of the printheads 214 may include at least printhead die 220. In various implementations, the printhead dies 220 may comprise printhead die slivers. Although ten printheads 214 are shown in a staggered configuration, more or fewer printheads 214 may be used and/or may be arranged in a different configuration. Likewise, although each of the printheads 214 is illustrated as having four printhead die slivers 220, more or fewer printhead die slivers 220 may be used and/or may be arranged in a different configuration. In addition, although one row of staggered printheads 214 is shown, more rows may be possible. For example, in some configurations, a fluid ejection panel may include multiple rows of printheads 214, and in at least some of these configurations, multiple rows of printheads 214 may print multiple different color.

Each printhead 214 may include a single printhead die sliver 220 or multiple die slivers 220, each sliver 220 with at least one row of drop ejectors 216 exposed at a surface of the printed circuit board 106 through which printing fluid may be ejected from corresponding fluid ejection chambers 236. The printhead dies 220 may be embedded in the printed circuit board 218 using an encapsulant 238. As illustrated, for example, the printed circuit board 218 includes a cavity (defined by walls 240) that extends from the front side 221 of the printed circuit board 218 to the back side 219 of the printed circuit board 218, and the printhead dies 220 are embedded in the encapsulant 238 in the cavity 240 to couple the printhead dies 220 within the printed circuit board 218.

The fluid ejection panel 201 may include a fluid feed slot/channel 242 at a surface opposite the exposed drop ejectors 216 in the printed circuit board 218 to supply printing fluid to a fluid passage 244 of the printhead die sliver 220. The fluid passage 244 may be fluidically coupled to the drop ejectors 218 via the fluid ejection chambers 236 such that fluid may flow from the fluid feed slot 242 to the drop ejectors 216 for drop ejection. Other suitable configurations for each printhead 214 may be possible. For example, more or fewer printhead die slivers 220 may be used with more or fewer ejection chambers 236 and fluid feed slots 242 or larger dies (not slivers) may be used.

Printing fluid may flow into each ejection chamber 236 from a manifold 248 extending lengthwise along each die sliver 220 between the two rows of ejection chambers 236. Printing fluid may feed into the manifold 246 through multiple fluid passages 244 connected to the printing fluid feed slot/channel 242 at the bottom surface of the die 220. The idealized representation of a printhead die 220 in FIG. 3 and FIG. 4 depicts three layers 248, 250, 252 for convenience only. An actual inkjet printhead die sliver 220 may be a typically complex integrated circuit (IC) structure formed on a silicon substrate 248 with layers and elements not shown in the drawings. For example, a thermal ejector element or a piezoelectric ejector element formed (not shown) on substrate 248 at each ejection chamber 236 may be actuated, via electrical terminals 254, to eject drops or streams of ink or other printing fluid from drop ejectors 216.

The printed circuit board 218 may include a plurality of layers including at least one conductor layer 256. In many implementations, the printed circuit board 218 may include alternating layers of conductor layers and insulating layers, and may include redistribution layers or conductive pathways electrically connecting various parts of the conductor layers to each other and/or to a component external to the printed circuit board 218. As such, although the drawings depict the panel 201 as including a single conductor layer 256, for simplicity's sake, it is contemplated that the printed circuit board 218 may include additional conductor layers. For example, the printed circuit board 218 may include a conductor layer at both surfaces of the printed circuit board 218 (e.g., conductor layer 256 at the first surface and another conductor layer the second surface, opposite the first surface, of the printed circuit board 256).

The conductor layer 256 may include at least one bond pad 258 electrically connected to an electrical terminal 254 of at least one of the printhead dies 220. The conductor layer 256 may carry electrical signals to the drop ejectors 216 and/or other elements of the printhead dies 220, and in some implementations, may be electrically connected to an ASIC or other non-printhead die electronic device 260 embedded in the printed circuit board 218. In at least some implementations, the conductor layer 256 may include a ground layer, which may allow for electrostatic discharge. In some implementations, the printhead dies 220 may be electrically connected to each other. In the example shown, the conductor layer 256 may be electrically connected to the printhead dies 220 through bond wires 262. As shown, the bond wires 262 may be covered by a cap 264 or encapsulant material. Although the illustrated examples depict printhead dies 220 wire-bonded to the printed circuit board 218, other electrical interconnection arrangements may be possible within the scope of the present disclosure. For example, in some implementations, a printhead die 220 may be electrically interconnected to a printed circuit board 218 by solder, conductive adhesive, or the like. In various implementations, the printed circuit board 218 may include a protective layer 288 to protect the conductor layer 256 and/or another part of the printed circuit board 218.

In some implementations, rather than electrically connecting a top/front side 221 of the printhead die 220 to the printed circuit board 218, as illustrated in the drawings, a printhead die 220 may instead have a through-silicon via (not illustrated) to electrically connect the an electrical terminal 254 of the printhead die 220 to a conductor layer at a bottom/back side 219 of the printed circuit board 218 or a conductive layer between the front side 221 and the back side 219, either directly or via a redistribution layer. In other implementations, the printhead die 220 may be electrically connected to the conductor layer 256 at the front side 221 of the printed circuit board 218 via another conductive pathway.

As can be seen in FIG. 3, a portion of the encapsulant 238 at the back side 219 of the printed circuit board 218 is removed (indicated generally by 268), which exposes the fluid feed slot 242 such that fluid may flow to the fluid passage 244 in the printhead dies 220. In the illustrated example, the portion of the encapsulant 238 has been removed using a plunge-cut saw, forming a rounded cut into the encapsulant 238. In various implementations and as described more fully below, the fluid feed slot 242 with walls 220 extending toward the back side 219 of the printed circuit board 218 may be defined by using a molding material to allow the depth to which the encapsulant 238 is to be removed to expose the openings to the fluid passages 244 to be minimized as compared to methods not using the molding material. As indicated by the hashed line 270 in FIG. 3, for instance, forming the fluid feed slot 242 by cutting into the back side 219 of the printed circuit board to expose the fluid passages 244 may often result in a deeper cut. In the illustrated example, the deeper cut may interact with the printed circuit board 218 due at least in part to the radius of the plunge-cut saw blade. Using the molding material to form the fluid feed slot 242 in accordance with various implementations of the present disclosure may avoid need to resort to increasing the printhead die 220 length, enlarging the cavity 240 of the printed circuit board 218, or forming a step in the printed circuit board 218 to avoid the saw blade, or some combination thereof. Instead, in various implementations of the present disclosure, the length of the printhead die 220 may be reduced without further customization of the printed circuit board 218.

FIGS. 6-14 illustrate an example method for making a fluid ejection apparatus comprising a molded fluid ejection panel. FIG. 15 is a flow diagram including operations of the method illustrated in FIGS. 6-14. It should be noted that various operations discussed and/or illustrated may be generally referred to as multiple discrete operations in turn to help in understanding various implementations. The order of description should not be construed to imply that these operations are order dependent, unless explicitly stated. Moreover, some implementations may include more or fewer operations than may be described. It addition is noted that although FIGS. 6-14 depict a single printhead die embedded in a single cavity of a printed circuit board, most implementations comprise embedding a plurality of printhead dies in a cavity of a printed circuit board, and embedding other pluralities of printhead dies in other cavities of the printed circuit to form a fluid ejection panel such as, for example, the one illustrated in FIG. 2. Further, although not illustrated, after forming the molding fluid ejection panel described below, the method may include fluidically coupling the fluid feed slots of the printhead die to a fluid reservoir (such as, e.g., the fluid reservoir described herein with reference to FIG. 1) to form a fluid ejection apparatus and to provide fluid to the fluid passage.

Figure 6:
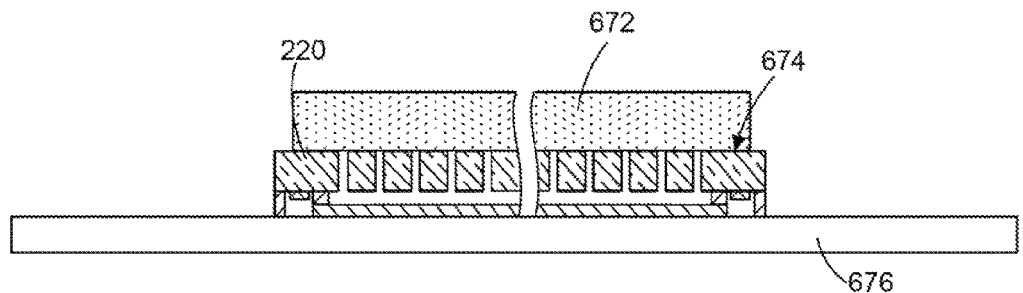
FIGS. 6-14 illustrate various operations of methods for making a fluid ejection apparatus.

Turning now to FIG. 6, the method may begin or proceed with forming a molding material 672 on the back surface 674 of the printhead die 220 over an opening of at least fluid passage 244 (operation 1501 of FIG. 15). In various implementations, the printhead die 220 may be mounted on a carrier 676 such as, for example, tape or other carrier prior to forming the molding material 672 on the back surface 674. The molding material 672 may comprise any material suitable for forming a fluid feed slot in accordance with the various implementations described herein. Example materials for the molding material 672 may include, but are not limited to, waxes, thermoplastics, or the like. As implemented herein, the molding material 672 may be referred to as a lost wax"or lost mold" as the molding material 872 is removed later in the method, as described below.

Figure 7:
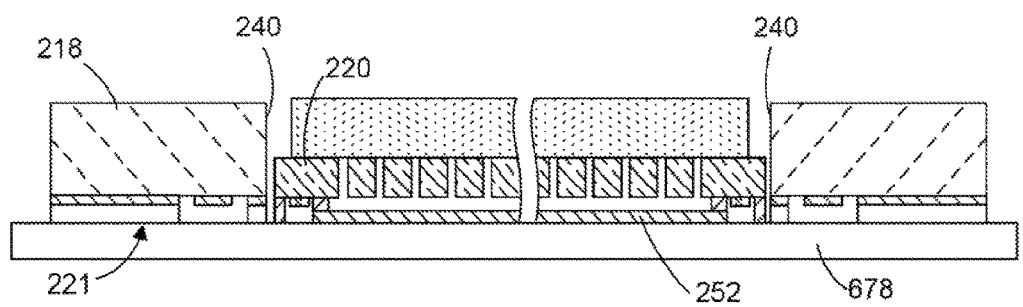

The method may proceed to FIG. 7 with forming a barrier 678 over the front side 221 of the printed circuit board 220 to cover the cavity (defined by walls 240) in the printed circuit board 220, and arranging the printhead die 220 in the cavity 240 such that at least one drop ejector of nozzle plate 252 of the printhead die 220 faces the barrier 678. In some implementations, the barrier 678 may comprise a carrier, an adhesive coupled between the printed circuit board and a carrier, or another barrier. The barrier 678 may be identical to the carrier 676 shown in FIG. 6 or a different carrier.

Figure 8:
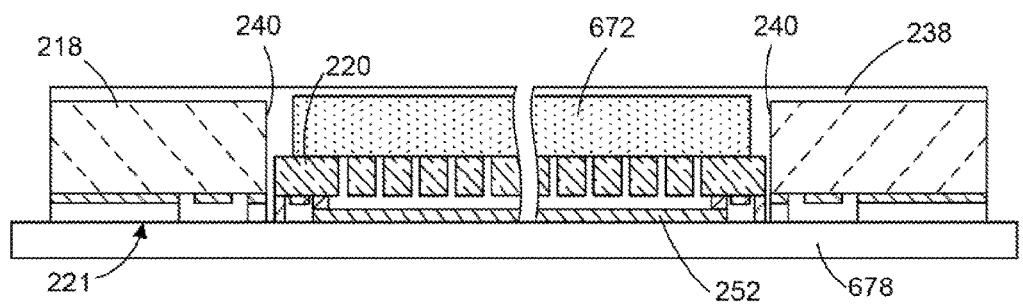
Figure 9:
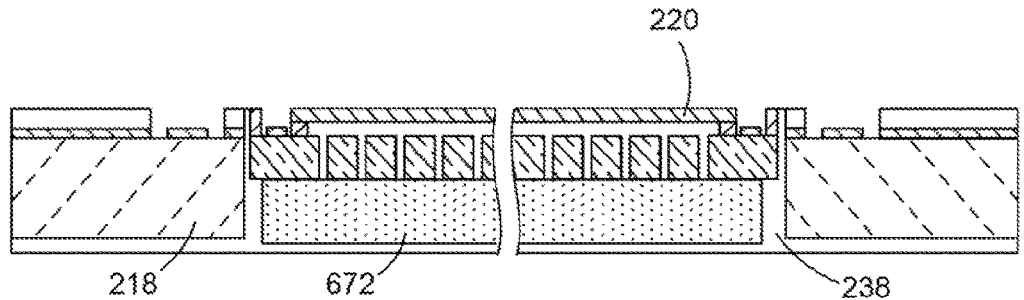

The method may proceed to FIG. 8 with forming an encapsulant 238 around the printhead die 220 and the molding material 672 to embed the printhead die 220 and the molding material 672 in the encapsulant 238 in the cavity 240 (operation 1503 of FIG. 15). As shown, the printhead die 220 is embedded such that the at least one drop ejector of the nozzle layer 252 abuts the carrier 666 so that the drop ejector 216 is not embedded in the encapsulant 238 but is instead exposed at the front side 221 of the printed circuit board 218 after removal of the carrier 676, as shown in FIG. 9.

Figure 10:
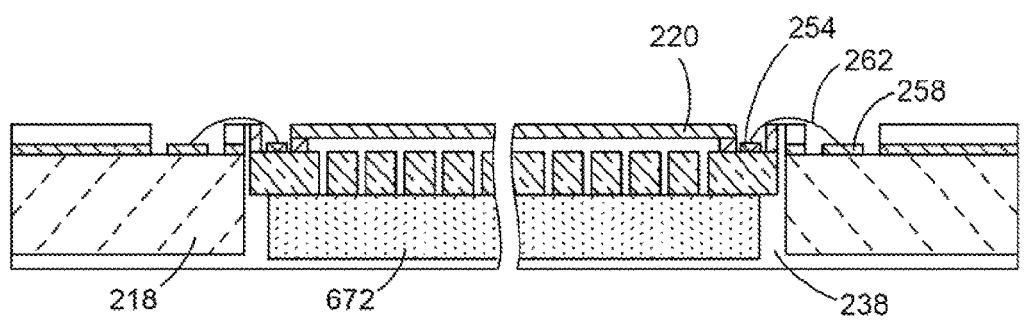
Figure 11:
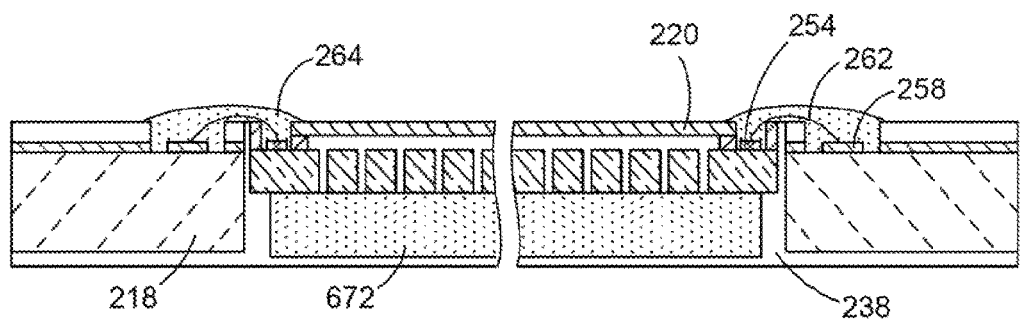

The method may proceed to FIG. 10 with electrically connecting the printhead die 220 to the printed circuit board 218. In various implementations, bond pads 258 of the printhead die 220 may be wire bonded to terminals 254 of the printed circuit board 218 by bond wires 262. In other implementations, the printhead die 220 may be electrically connected to the printed circuit board 218 by another type of electrical connection such as, for example, solder, conductive adhesive, or the like. In various implementations, the bond wires 262 may be covered by a cap 264 or encapsulant, as shown in FIG. 11.

Figure 12:
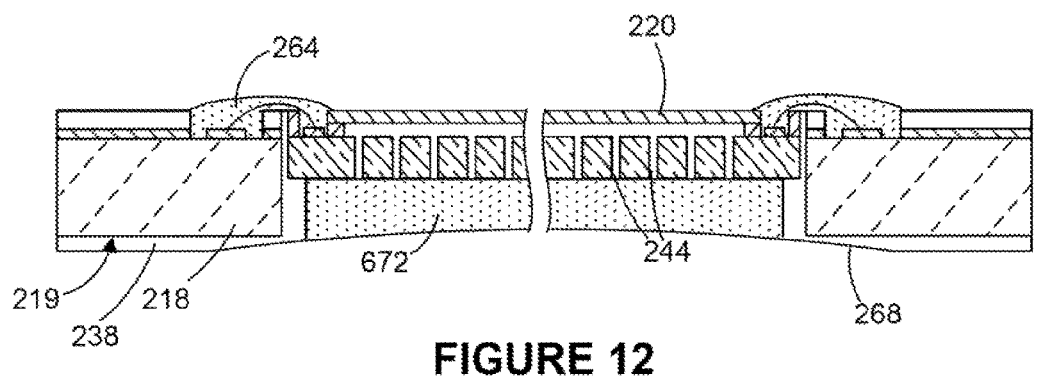
Figure 13:
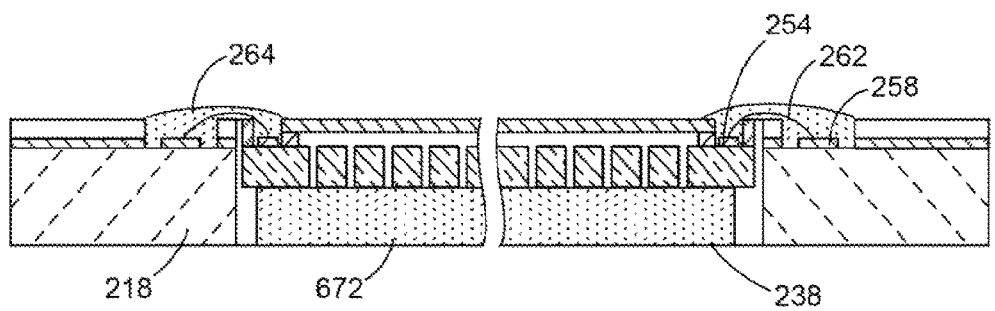

The method may proceed to FIG. 12 with removing at least a portion of the encapsulant 238 at the back side 219 of the printed circuit board 218 to expose the molding material 672 (operation 1505 of FIG. 15). In various implementations, the encapsulant 238 may be removed by cutting into the encapsulant 238 by plunge-cutting, back grinding, laser ablating, powder blasting, or another method, without cutting into the printed circuit board 218. In some implementations, the encapsulant 238 may be removed such that the back side 219 of the printed circuit board 218 is exposed at shown in FIG. 13.

Figure 14:
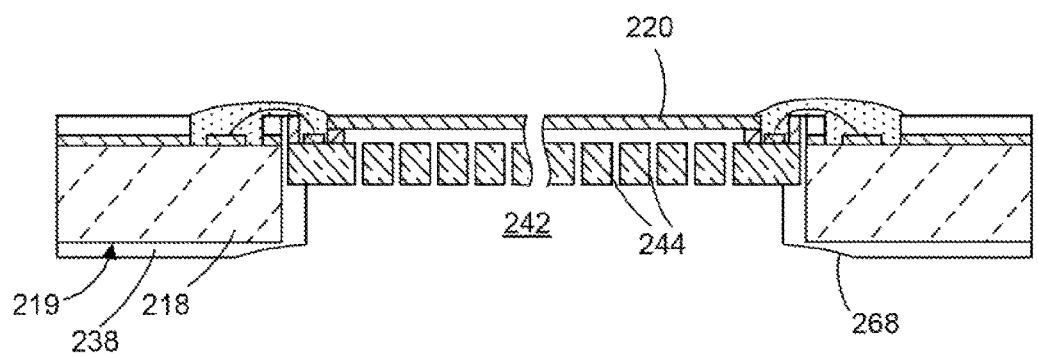
Figure 15:
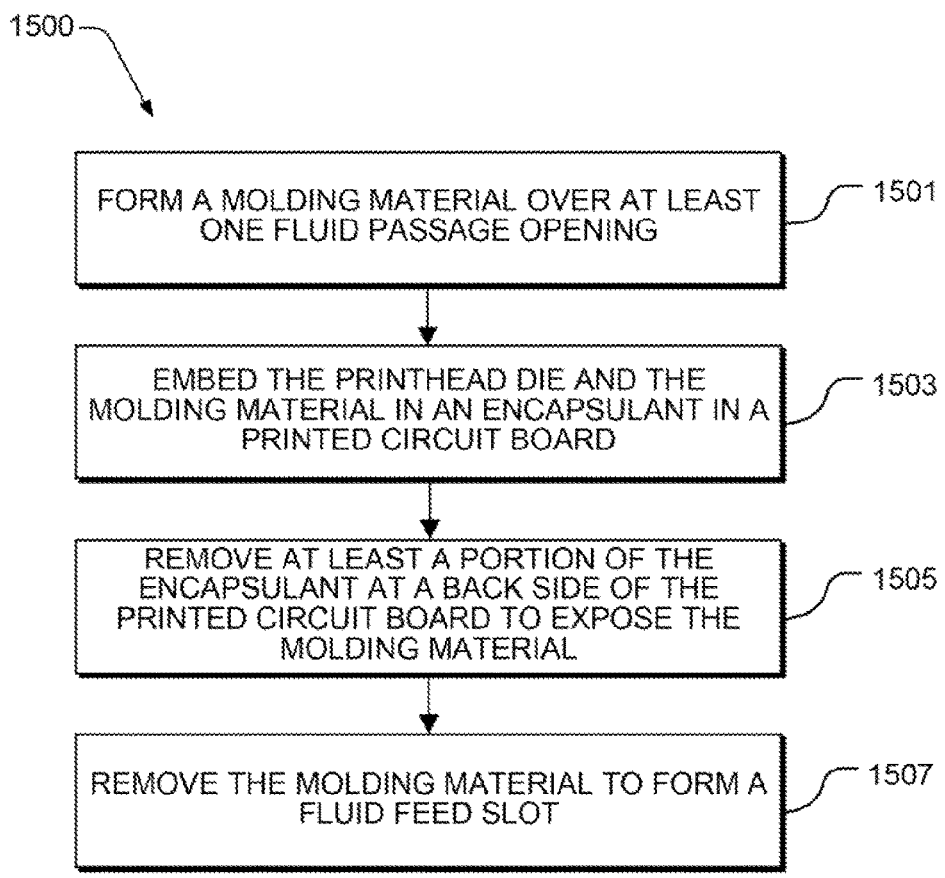
FIG. 15 is a flow diagram of an example method for making a fluid ejection apparatus.

As shown in FIG. 14, the method may proceed with removing the molding material 672 to form the fluid feed slot 242 through which fluid may flow to the at least one fluid passage 244 in the printhead die 220 (operation 1507 of FIG. 15). In various implementations, the molding material 672 may be removed by washing or rinsing away using a suitable solvent such as, for example, water. In other implementations, the molding material 672 may be removed by melting or another method.

Various aspects of the illustrative embodiments are described herein using terms commonly employed by those skilled in the art to convey the substance of their work to others skilled in the art. It will be apparent to those skilled in the art that alternate embodiments may be practiced with only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details. In other instances, well-known features are omitted or simplified in order not to obscure the illustrative embodiments.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. It is manifestly intended, therefore, that embodiments be limited only by the claims and the equivalents thereof.

What is claimed is:

1. A method for making a fluid ejection apparatus, comprising:
    providing a printhead die having a first surface including at least one drop ejector and a back surface including at least one fluid passage opening;
    forming a molding material on the back surface of the printhead die over the at least one fluid passage opening;
    embedding the printhead die and the molding material in an encapsulant in a cavity in a printed circuit board;
    removing at least a portion of the encapsulant at a back side of the printed circuit board to expose the molding material; and
    removing the molding material to form a fluid feed slot through which fluid may flow to the at least one fluid passage opening in the printhead die.

2. The method of claim 1, wherein the cavity extends from a front side of the printed circuit board to the back side of the printed circuit board, and wherein said embedding comprises embedding the printhead die such that the at least one drop ejector is exposed at the front side of the printed circuit board.

3. The method of claim 1, wherein said removing the at least the portion of the encapsulant comprises plunge-cutting into the encapsulant at the back side of the printed circuit board to expose the molding material.

4. The method of claim 1, wherein said removing the at least the portion of the encapsulant comprises back grinding, laser ablating, or powder blasting the encapsulant at the back side of the printed circuit board to expose the molding material.

5. The method of claim 1, wherein the molding material comprises wax or a thermoplastic material.

6. The method of claim 1, further comprising electrically connecting the printhead die to the printed circuit board.

7. The method of claim 6, wherein said electrically connecting the printhead die to the printed circuit board comprises wire bonding the printhead die to the printed circuit board.

8. The method of claim 1, wherein said embedding the printhead die and the molding material in the encapsulant comprises:
　applying a barrier over a front side of the printed circuit board to cover the cavity;
　arranging the printhead die in the cavity such that the at least one drop ejector faces the barrier; and
　forming the encapsulant around the printhead die to embed the printhead die in the cavity.

9. The method of claim 8, wherein the barrier comprises a carrier adhesively coupled to the printed circuit board.

10. The method of claim 1, wherein the printhead die is a sliver die having a ratio of length to width of at least three.

11. The method of claim 1, wherein the printhead die comprises a manifold extending lengthwise along each printhead die between rows of ejection chambers.

12. The method of claim 1, wherein the encapsulant exposes the at least one drop ejector.

13. A method for making a fluid ejection apparatus, comprising:
　forming a molding material over a fluid passage on a back surface of printhead die;
　arranging the printhead die in a cavity of a printed circuit board;
　forming an encapsulant in the cavity having the printhead die therein such that at least one drop ejector of the printhead die is exposed at a front side of the printed circuit board;
　cutting into the encapsulant at a back side of the printed circuit board to expose the molding material; and
　removing the molding material to form a fluid feed slot through which fluid may flow to the fluid passage opening in the printhead die.

14. The method of claim 13, wherein the cavity extends from the front side of the printed circuit board to a back side of the printed circuit board.

15. The method of claim 13, wherein said cutting the encapsulant at the back side of the printed circuit board to expose the molding material of each of the plurality of printhead dies comprises plunge-cutting into the encapsulant without cutting into the printed circuit board.

16. The method of claim 13, wherein the printhead die is a first printhead die and the cavity is a first cavity, and wherein the method further comprises arranging a second printhead die in a second cavity, forming the encapsulant in the second cavity having the second printhead die therein such that at least one drop ejector of the second printhead die is exposed at the front side of the printed circuit board.

17. A method for making a fluid ejection apparatus, comprising:
　forming a molding material over a plurality of fluid passage openings at a back surface of each of a plurality of printhead dies;
　embedding the plurality of printhead dies in an encapsulant in a cavity in a printed circuit board such that a plurality of drop ejectors fluidically coupled to the plurality of fluid passage openings is exposed at a front side of the printed circuit board;
　removing at least a portion of the encapsulant at a back side of the printed circuit board to expose the molding material;
　removing the molding material exposed after said removing the portion of the encapsulant to form fluid feed slots; and
　fluidically coupling the fluid feed slots of the plurality of dies to a fluid reservoir to provide fluid to the plurality of fluid passage openings.

18. The method of claim 17, wherein said removing the at least the portion of the encapsulant at the back side of the printed circuit board to expose the molding material of each of the plurality of printhead dies comprises plunge-cutting into the encapsulant without cutting into the printed circuit board.

19. The method of claim 17, wherein the plurality of printhead dies is a first plurality of printhead dies and the cavity is a first cavity, and wherein the method further comprises embedding a second plurality of printhead dies in an encapsulant in a second cavity in the printed circuit board such that a plurality of drop ejectors of the second plurality of printhead dies fluidically coupled to a plurality of fluid passages of the second plurality of printhead dies is exposed at the front side of the printed circuit board.

20. The method of claim 17, wherein the plurality of printhead dies are staggered along a length of the printed circuit board.

* * * * *